(12) United States Patent
Whiteman

(10) Patent No.: US 9,563,999 B2
(45) Date of Patent: Feb. 7, 2017

(54) METHOD AND SYSTEM FOR IDENTIFYING A SECURITY DOCUMENT

(71) Applicant: DE LA RUE INTERNATIONAL LIMITED, Basingstoke, Hampshire (GB)

(72) Inventor: Robert Whiteman, Reading (GB)

(73) Assignee: DE LA RUE INTERNATIONAL LIMITED, Basingstoke (GB)

( * ) Notice: Subject to any disclaimer, the term of this patent is extended or adjusted under 35 U.S.C. 154(b) by 2 days.

(21) Appl. No.: 14/412,576

(22) PCT Filed: Jul. 1, 2013

(86) PCT No.: PCT/GB2013/051738
§ 371 (c)(1),
(2) Date: Jan. 2, 2015

(87) PCT Pub. No.: WO2014/006386
PCT Pub. Date: Jan. 9, 2014

(65) Prior Publication Data
US 2015/0356805 A1 Dec. 10, 2015

(30) Foreign Application Priority Data
Jul. 2, 2012 (GB) .................................. 1211686.9

(51) Int. Cl.
*G06K 9/00* (2006.01)
*G07D 7/02* (2016.01)
(Continued)

(52) U.S. Cl.
CPC ............. *G07D 7/026* (2013.01); *G06K 7/0004* (2013.01); *G07D 7/00* (2013.01); *H04N 7/18* (2013.01)

(58) Field of Classification Search
None
See application file for complete search history.

(56) References Cited

U.S. PATENT DOCUMENTS

2004/0012773 A1\* 1/2004 Puttkammer .......... G07D 7/026
356/71
2009/0097731 A1\* 4/2009 Sanada ................ A61B 5/0205
382/132

(Continued)

FOREIGN PATENT DOCUMENTS

GB 2434904 A 8/2007
WO 9007165 A1 6/1990
(Continued)

OTHER PUBLICATIONS

Jan. 7, 2014 Search Report issued in International Application No. PCT/GB2013/051738.
(Continued)

*Primary Examiner* — Hadi Akhavannik
(74) *Attorney, Agent, or Firm* — Oliff PLC

(57) ABSTRACT

A method is provided of identifying a security document using an identifying device. The identifying device is provided with a capacitance sensor and a second sensor. The method includes capacitively coupling a first element of the security document with the capacitance sensor and obtaining first data from the first element using the capacitance sensor. Second data is also obtained from the security document using the second sensor. Output data is then generated based upon the first and second data. A corresponding device and system are also presented.

23 Claims, 5 Drawing Sheets

(51) Int. Cl.
*H04N 7/18* (2006.01)
*G06K 7/00* (2006.01)
*G07D 7/00* (2016.01)

(56) References Cited

U.S. PATENT DOCUMENTS

| | | | | |
|---|---|---|---|---|
| 2009/0143667 | A1* | 6/2009 | Kovacs | A61B 5/021 600/410 |
| 2010/0094122 | A1* | 4/2010 | Kiraly | A61B 5/021 600/419 |
| 2011/0243403 | A1* | 10/2011 | Mizuno | G06T 7/0012 382/128 |
| 2012/0022843 | A1* | 1/2012 | Ionasec | G06T 13/20 703/9 |
| 2013/0101184 | A1* | 4/2013 | Harrold | G06T 7/0012 382/124 |

FOREIGN PATENT DOCUMENTS

| | | |
|---|---|---|
| WO | 02059840 A2 | 8/2002 |
| WO | 2005116941 A1 | 12/2005 |
| WO | 2012038434 A1 | 3/2012 |

OTHER PUBLICATIONS

Oct. 24, 2014 International Preliminary Report on Patentability issued in International Application No. PCT/GB2013/051738.

* cited by examiner

METHOD AND SYSTEM FOR IDENTIFYING A SECURITY DOCUMENT

FIELD OF THE INVENTION

The present invention relates to a method for identifying a security document using a capacitive element. The invention also includes a suitable system for performing the method.

BACKGROUND TO THE INVENTION

The use of capacitive techniques provides a convenient and straightforward method of obtaining information from a security document, in particular information concerning the nature of the document which may include some measure of its authenticity. Unfortunately the nature of capacitive coupling means that problems are encountered in terms of the accuracy with which such information can be read. This is caused by limitations of the sensors used for this purpose and the different conditions under which such documents are interrogated, these including different contact conditions caused, in particular, by the condition of the security document. The outcome of these effects is that a problem occurs in the reliability of the identification of the documents. There are a range of practical situations in which this can very restrictive upon the usability of the technique. Thus the extent of wider adoption of capacitive sensing techniques upon security documents has a strong dependence upon advances in capacitive sensing technology. It is in this context that the present invention has been developed.

SUMMARY OF THE INVENTION

In accordance with a first aspect of the present invention we provide a method of identifying a security document using an identifying device provided with a capacitance sensor and a second sensor, the method comprising:
a) capacitively coupling a first element of the security document with the capacitance sensor;
b) obtaining first data from the first element using the capacitance sensor;
c) obtaining second data from the security document using the second sensor; and
d) generating output data based upon the first and second data.

The present invention addresses the problems identified above by obtaining supplementary information regarding the security document. In particular a second sensor is used to obtain second information from the security document which is then used to generate output data. The output data therefore provides increased levels of accuracy in the identification of the particular security document. This therefore may lead to an enhanced level of confidence from the user of the device in the accuracy of the identification. In providing greater reliability of identification the method may be used to provide a level of authentication of the security document.

In most cases step (a) comprises contacting the capacitance sensor with the surface of the security document. This is advantageous in a number of different implementations such as when the first element is buried within the document rather than being on or forming the document surface. It is also advantageous to maximise the signal-to-noise ratio of the capacitive signal which enables a greater resolution of information or a greater reading speed to be achieved. Nevertheless it is also within the scope of the invention for the capacitance sensor to be positioned in a non-contacting manner such that there is a physical gap between the first sensor and the capacitive element. Such an arrangement may be used if the capacitance device is positioned within a high speed processing apparatus for example where the gap may be effected reliably. The first data may be obtained by stationary relative positioning between the capacitance sensor and the first element, or alternatively by providing relative movement between these components.

The use of capacitance not only allows a "signature" in terms of a spectral shape indicative of the capacitive response, it also allows a degree of spatial information to be encoded within the first element. The capacitance may therefore be modulated at different positions within the first element. It is noted here that the first element is not necessarily required to be unitary, it may take the form of a number of spatially separated and unconnected parts. The encoding of spatial information into the first element provides for the first data comprising spatial information relating to the first element. Hence the first data may typically comprise information relating to the size, shape or position of the first element (or its constituent parts) within the security document.

Regarding the second data obtained by the second sensor, in practice the second sensor may take a number of forms providing sensing of optical, audible, magnetic, radio frequency (for example near field communication) or other information. The second data obtained in step (c) may relate to a physical characteristic of the security document. Typically the second data is image data and the second sensor is an imaging sensor, such as a camera. A line scan device, coupled with relative movement between the device and the document may provide image data in an analogous manner.

The use of two different sensing techniques allows the information from the first and second sensors to be obtained from entirely separate regions of the document. A second element may be present which provides the information to be read by the second sensor and this may be entirely independent of the capacitance element. The second data may be obtained from the security document in respect of a second region, the second region comprising at least a part of a first region comprising the first element. The first and second elements may therefore be integrated or the same.

Having obtained the first and second data, preferably the step of generating the output data comprises analysing whether the first data and second data are related by a predetermined relationship. Such a relationship may be embodied in a suitable database for example in a look-up table. Alternatively, or in addition, it may be embodied in a predetermined relationship which may be a mathematical relationship. In perhaps the simplest relationship the first data and second data may represent substantially the same information. However, the first data may represent part of the second data such as relating to part of the region from which the second data is obtained, or in the sense of a representation of the second data at a lower resolution for example.

The generating of the output data in accordance with step (d) may be implemented in a number of different ways. For example it may be performed entirely within a unitary local identifying device. In the case that the identifying device is a portable device (such as a handheld device) then it may be advantageous to perform some of step (d) at a remote location. In this case step (d) comprises the identifying device transmitting one or each of the first and second data to a remote system such as a computer, wherein the remote system applies the transmitted data to the predetermined relationship thereby generating result data and wherein the remote system transmits the result data to the identifying device. This enables data embodying the relationship to be located and maintained centrally. The transmission may be effected by wired or wireless networks including mobile telephone networks. The communication with the remote system may be via the Internet.

Typically the method further comprises generating an output signal in accordance with the output data. The output signal may be an electronic signal for interpretation and processing by electronic apparatus. For example the signal may be used by a controller of a processing apparatus to operate a diverter of a conveyor system allowing the particular document in question to be routed in dependence upon the signal. In other cases the output signal may be a signal to a user of the identifying device regarding one or each of the identity or authenticity of the security document. Such a signal might be represented audibly or visually using suitable apparatus.

With further reference to the security document, the first element typically contains an electrically conductive region so as to provide a capacitive effect. The electrically conductive region may be a region of metallic foil or of conductive ink for example. This may be arranged in a wide variety of geometries. At least part of the first region may be arranged as a one dimensional or matrix barcode for example. As a further example, the electrically conductive region may be part of an "RFID" component of the security document, such as the RFID antenna.

When the conductive region is brought into close proximity to the capacitance sensor, the electric field in a proximal region of the sensor and the conductive region is modified, this causing a capacitive effect which may be detected by the capacitive sensor.

Typically the capacitance sensor is a sensor adapted to detect localised changes in electric field. The capacitance sensors generally include a conductive element covered with a layer of dielectric, and these interact with the "sensed" conductive region together so as to form a capacitor whose properties are measureable electrically. A widely used example of a suitable capacitance sensor is that of a touchscreen. Of course more specific capacitance sensors designed for the application of this invention may also be used. Touchscreens are however advantageous in situations where a user such as a member of the public wishes to use the method. Such users often own handheld devices (including personal digital assistants, tablet computers and in particular mobile telephones) which are equipped with touchscreens. Such devices are generally portable which allows the users to perform the method during their daily activities which provides a particular benefit if the security document under scrutiny is currency.

As an alternative to touchscreens, the capacitance sensor may also take the form of a touchpad or trackpad as commonly found on laptop computers. It is also possible that bespoke reading device could be provided with a touchpad or trackpad which can be used as the capacitance sensor.

In accordance with a second aspect of the invention we provide a security document identifying system adapted in use to perform the method according to the first aspect of the invention.

In accordance with a third aspect of the invention we provide a security document identifying device adapted in use to perform the method according to the first aspect of the invention, wherein the device comprises a capacitance sensor, a second sensor and an onboard computer, and wherein the step of generating the output data comprises the identifying device providing one or each of the first and second data to the onboard computer, wherein the onboard computer processes the data according to a predetermined relationship thereby generating result data and wherein the onboard computer provides the result data to a recipient.

An identifying device according to the third aspect of the invention may therefore be used substantially autonomously without the need for contact with a remote computer, other than for example the receipt of updates of its software or information defining the predetermined relationship. The recipient in this case may be a user such as the owner of a handheld device, or may alternatively, or in addition, be a remote computer system. In the case of the sole recipient being a remote computer system, this might be the case where it is desired to perform spot checks on security documents in the field and it is not necessary to provide the result to the user performing the checks.

In accordance with a fourth aspect of the invention we provide a security document identifying system adapted in use to perform the method according to the first aspect of the invention, wherein the system comprises:

an identifying device provided with a capacitance sensor and a second sensor; and, a computer in selective communication with the identifying device, wherein the step of generating the output data comprises the identifying device transmitting one or each of the first and second data to the computer, wherein the computer processes the transmitted data according to a predetermined relationship thereby generating result data.

When the system is provided as part of a security document processing system then the result data may be used in a number of ways, for example to sort, divert or label the security document in a certain way. In the case that the computer is positioned remotely from the device (and in communication via a network such as a wireless network for example) then the result data may be transmitted from the computer to the identifying device for use by that device.

In accordance with a fifth aspect of the invention we provide a computer program product comprising computer program code adapted in use to perform the method according to the first aspect of the invention when the computer program code is executed upon a computer device. For example, such a computer program product may take the form of a downloadable application for a mobile telephone device which configures the device in use for functioning as the identifying device.

BRIEF DESCRIPTION OF THE DRAWINGS

Some examples of a method, device and system according to the invention are now described with reference to the accompanying drawings, in which.

DESCRIPTION OF EXAMPLES

A number of examples of the invention are described below. It is intended that particularly features illustrated in respect of one example are generally understood to be applicable to the other examples. Many of the examples discuss banknotes although it is to be understood that many types of security documents, including fiscal stamps, security labels, passports, identity documents (such as driving licenses and ID cards), bonds and so on may be identified using the invention. In general the invention describes how the combination of capacitance sensing and other forms of security document sensing may be used in combination to allow more general application of capacitance detection in numerous security document applications.

Figure 1:
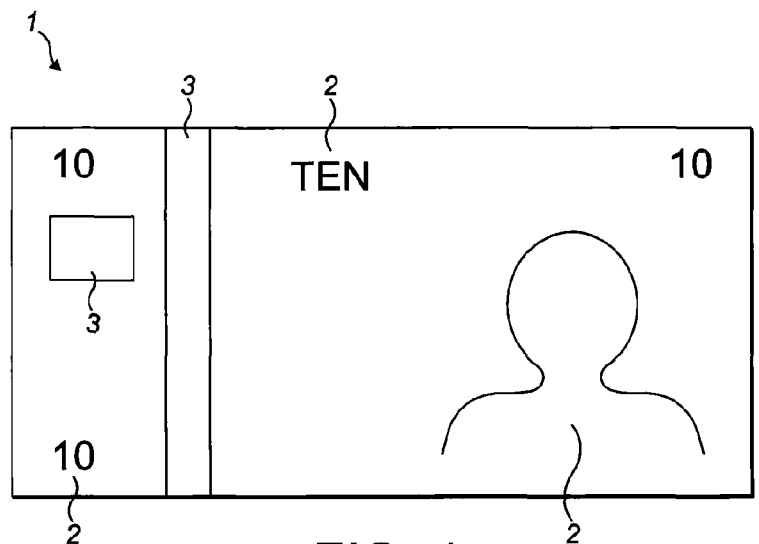
FIG. 1 is a schematic representation of a security document taking the form of a bank note.

FIG. 1 illustrates a typical example security document 1 for use with the invention. In this case the security document 1 takes the form of a bank note. The bank note contains a number of security features as are known in the art, these including the use of specialist ink compositions including magnetic printing inks, specialised printing techniques including intaglio printing, local variations in the density of the substrate material from which the bank note is constructed, in the form of watermarks, amongst others. Many such features are arranged as indicia which may be visible in the optical or non-optical spectrum (such as infra-red, ultraviolet and so on) and include diffractive responses and/or images.

One or more of these features are typically interrogated either by automated devices or by human users in order to make a decision regarding the authenticity of the bank note. In addition some features are used by visually impaired users in order to distinguish between particular denominations of certain currency. The features discussed above are generally represented at 2 in FIG. 1.

A second type of security feature is defined for discussion within the present application, this being one which contains electrically conductive material. Examples of such features in bank notes which are already known in the art are metallic holographic elements, foil stripes, threads (which may be partially embedded) and conductive inks such as those containing copper or silver pigments or nanoparticulate inks. Examples of these features are illustrated schematically at 3 in FIG. 1. For the purposes of the present application the latter features are referred to as capacitive elements, whereas the former features are referred to as second elements. A capacitive element may be distinguished from a second element in that a capacitive element has sufficient size and electrical conductivity so as to sufficiently modify an electric field in the region of the element thereby allowing a measurable capacitive response to be generated by the structure.

Figure 2:
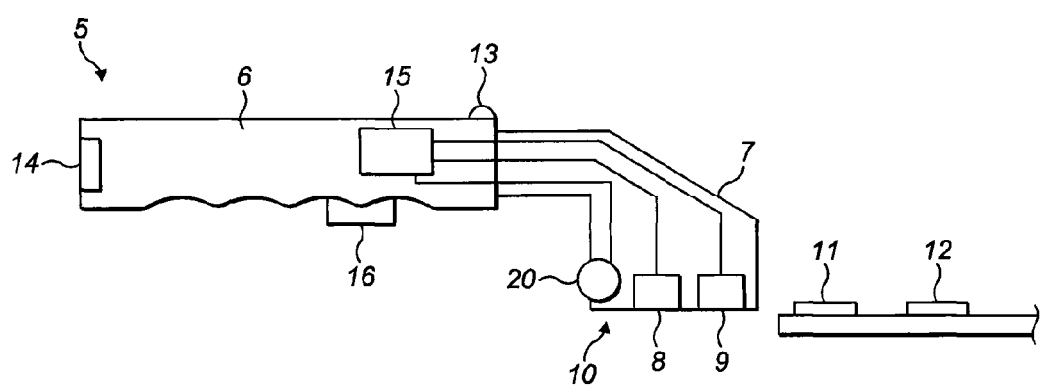
FIG. 2 shows a first example of a security document identification device according to the invention.

FIG. 2 shows a bespoke security document identification device in the form of a handheld reader 5. The reader is provided with a body 6 for containing a power source, microcomputer 15 and associated electronic circuitry, the body being equipped with a grip for ease of holding by a user. Attached to the body 6 at one end is a read head 7 which contains a capacitive contact sensor 8 and a magnetic sensor 9, these having parallel surfaces which are coplanar with a general reading surface 10. When the reader is in use, a planar surface of the bank note 1 is passed across the reading surface. As is also shown in FIG. 2, the bank note 1 is provided with a holographic foil 11 and a region of magnetic printing ink 12 (these being examples of features 2 and 3 of FIG. 1 respectively).

When the reader 5 is in use, which may be initiated by operation of the trigger 16, the microcomputer 5 monitors the magnetic sensor 9 for a signal indicative of the presence of magnetic material. Thus, when the surface of the bank note 1 is moved across the surface 10 (or vice versa) the movement of the magnetic printing ink 12 induces a small current in the magnetic sensor 9 which is then recorded by the microcomputer 15. The reader device 5 also includes a roller 20. This is positioned adjacent the reading surface 10 so as to roll over the surface of the bank note 1. The roller is attached to an encoder which allows the computer to calculate the relative speed of displacement between the bank note 5 and reader head 7. The use of this information allows some rough measure of the position of each of the elements being detected.

The capacitive contact sensor 8 may be implemented by using known sensor technology. It is of course necessary to select an appropriate sensor for the application in question and in the present case this is determined by the relatively small amount of conductive material present in a holographic foil 11. The sensor 8 in this case is driven by an alternating current signal under the control of the microcomputer 15, although some sensors may be powered by direct current. The actual sensing area of the sensor 8 may be encircled by a guard so as to contain the electric field generated. It will be appreciated here that a number of different design options are available for implementing the capacitive sensing. One major consideration is whether to rely upon mutual capacitance or self capacitance (also known as absolute capacitance), the latter requiring some greater consideration of the electrical grounding of the capacitive element. As will be appreciated, one or each of the sensor 8 and foil 11, will need to have a dielectric coating so as to produce a capacitive structure when the foil 11 and sensor 8 come into close contact.

When the holographic foil 11 travels past the sensor 8 the presence of the foil close to the detection area of the sensor affects the electric field in the sensing region of the sensor 8. This change in capacitance exists whilst the foil 11 provides capacitive coupling with the sensor 8. The change in the capacitance of the alternating current drive circuit is detected by the computer 15.

In the most simple case the computer is merely programmed to detect a predetermined magnitude of magnetic field using the magnetic sensor 9 and a predetermined capacitance from the sensor 8. If sufficient signals are detected from each sensor in a similar area then the computer produces an output signal which powers a small LED 13 on the handle 6, together with a small buzzer 14, in each case to alert the user that the bank note 1 has met the requirements of having magnetic and capacitive elements.

In this simple example a binary YES/NO is used for each sensor and a YES condition from each sensor triggers an output signal indicative of this condition, a NO from one or each sensor triggers a different output signal.

There are some practical situations where a simple system as described above may be useful, for example in small commercial premises where a merchant wishes to have some further reassurance that currency he is given by customers is in fact genuine. It will be appreciated that the provision of magnetic materials and electrically conductive materials on a substrate requires a significant level of sophistication and acts as a deterrent against counterfeiting.

Figure 3:
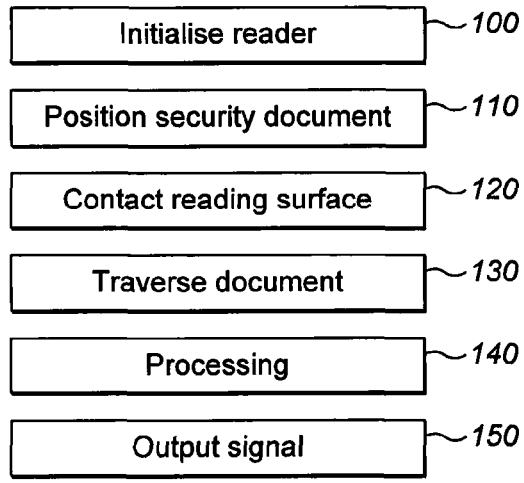
FIG. 3 is a flow diagram which is generally applicable, with modification, to the examples of the invention.

In order to clarify the use of the device 5 an example method of its use is described in association with the flow diagram FIG. 3.

At step 100 in FIG. 3 the reader device is initialised by the user. This might involve simply pressing a power switch (not shown in the figures) or by squeezing the trigger 16 briefly so as to cause the onboard microcomputer 15 to power up and ready itself for use. Once in the initialised state the LED 13 and buzzer 14 may be activated briefly.

At step 110, the user then obtains a security document 1 which they wish to inspect, this being a bank note in the present case. The bank note is rested upon a flat surface such as a table top.

At step 120, with the device 5 held in one hand and the bank note being steadied by the other hand, the user places the reading surface 10 of the read head 7 of the device 5 on the upper planar surface of the bank note 1, close to one edge and then squeezes the trigger 16.

At step 130, whilst keeping the trigger depressed, the user draws the surface 10 across the bank note causing at least the foil 11 to pass across the surface of the capacitive sensor 8, and the magnetic ink 12 to pass across the surface of the magnetic sensor 9. During this period the microcomputer operates each of the sensors 8,9 and samples the sensor outputs, thereby generating respective data for each sensor which is stored in an onboard memory of the microcomputer 15. In addition, position data is obtained from the roller 20 via its encoder. We note here that, in the case of the foil 11, optionally the user may ground the edge of the foil as it is being passed across the sensor 9 so as to provide an electrical ground and therefore improve the signal quality. Once the traverse of the bank note has been completed the user releases the trigger, this signalling to the microcomputer that the scan of the bank note has ended and that the computer should proceed with processing the sampled data.

At step 140, the microcomputer 15 processes the sampled data. The sampled data in each case is a number of magnitude readings sampled at regular time intervals. In the present simple example the data from the magnetic sensor 9 is analysed by comparing each sample with a predetermined amplitude value which is pre-programmed and held in the microcomputer memory. Some noise filtering may be performed upon the data prior to this comparison. The analysis of the data proceeds by looking for a sufficient number of samples which exceed the predetermined amplitude and which are relatively close together in the sampled data series. Since the traverse of the bank note may not have been at a constant speed, the sampled data from the roller 8 encoder allows the sampled data from the sensors to be converted into an approximate linear dimension. Thus, if a sufficient number of data samples within the same physical region exceed the predetermined threshold then the microcomputer concludes that magnetic material is present. The outcome of the analysis is therefore a YES or NO as represented in output data from each sensor.

The analysis of the data of each sensor proceeds in this manner and it will be understood that, due to the different nature of operation of the sensors, then different appropriate processing may be needed for each.

The outcome of the processing is that the microcomputer has a YES or NO result for each sensor.

At step 150, if the processing generates a YES for each of the sensors then it generates an output signal indicating a PASS of the testing by operation of the LED 13 and buzzer 14 in a first manner (such as an intermittent repeated operation). In the case of one or either sensor data resulting as a NO then a second output signal is generated indicating a FAIL, such as a constant operation of the LED and buzzer for a fixed period. The output signal may also be recorded as output data in the microcomputer's memory for later use in compiling statistics upon the number of passed and failed inspections. We note here that the microcomputer may be provided with either a direct (wired) data port allowing programming and access to the memory contents, or the provision of wireless communication via a protocol such as Bluetooth.

It will be noted from the above the device 5 in this example does not impose any requirements upon where the foil 11 and magnetic ink 12 are located upon the surface, merely whether or not each is found to be present within a reasonable "swipe" time period. This example discusses the combination of capacitive and magnetic sensors although it will be appreciated that the capacitive sensor may be combined with other sensor types, such as an opacity detector for locating a watermark as merely one of a number of examples. There is also no reason why a single sensor type may be combined with the capacitive sensor and therefore multiple sensors may be used in this example and the other examples to be described.

The method as described in association with FIG. 3, is generally applicable to each of the examples described herein, with appropriate modification to fit the particular implementation in question.

In an alternative implementation of the above example an additional level of security is added to each of the capacitive and magnetic sensors by modifying each sensor to detect material (of a capacitive and magnetic sense respectively) which extends in a particular direction. This might be achieved in each case by an appropriately shaped sensor or multiple instances of each sensor. Hence in the case of the capacitive sensor it may be then possible to measure the existence of a foil stripe by detecting capacitance at two positions spaced apart across the face of the bank note 1. Similarly the modified magnetic sensor may be used to detect multiple instances (or at least spaced material) of magnetic material.

Another example implementation of the invention is now described, this involving the use of a "smartphone" as the security document identification device.

Smartphones are now in widespread use as personal devices, providing not only mobile phone functionality but also combining this with powerful onboard computers, peripheral devices such as cameras and also enhanced networking capabilities providing connectivity to other devices by wireless local networking protocols. Due to the requirements of size, many smartphones are provided with touchscreens, that is a device which is capable of detecting the location of contact by a finger or stylus, together with acting as a display device.

A number of different touchscreen technologies are known in the art, including those operating based upon electrical resistance and even surface acoustic waves. However, the use of capacitive sensing as the preferred technique in touchscreen technology for mobile devices provides an extremely advantageous benefit in that many users are therefore already equipped with devices which may be adapted to operate with the present invention.

Returning to the example discussed in association with FIG. 2 it will be recalled that two types of sensor are present in that example, namely a magnetic sensor and a capacitive sensor.

In the present mobile telephone example, the two sensors are provided by the use of the touchscreen as a capacitive sensor, and the use of the smartphone camera as an optical sensor.

Figure 4:
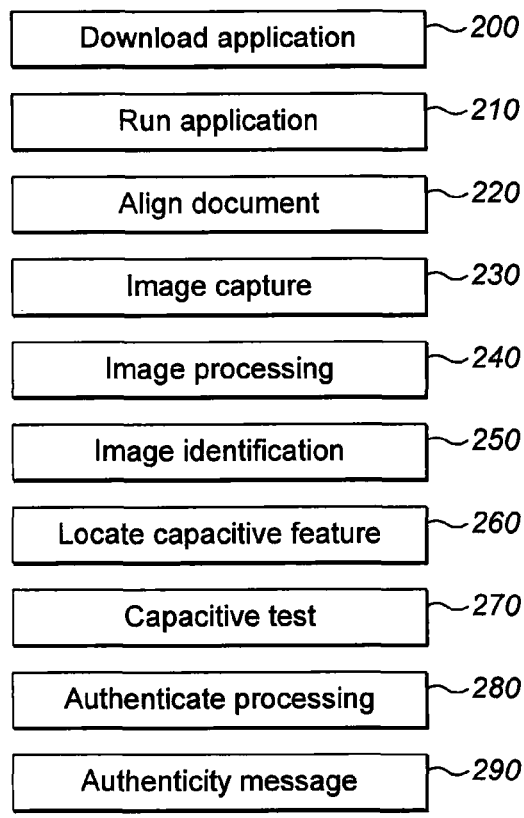
FIG. 4 is a flow diagram setting out the method applicable to a smartphone example.
Figure 5:
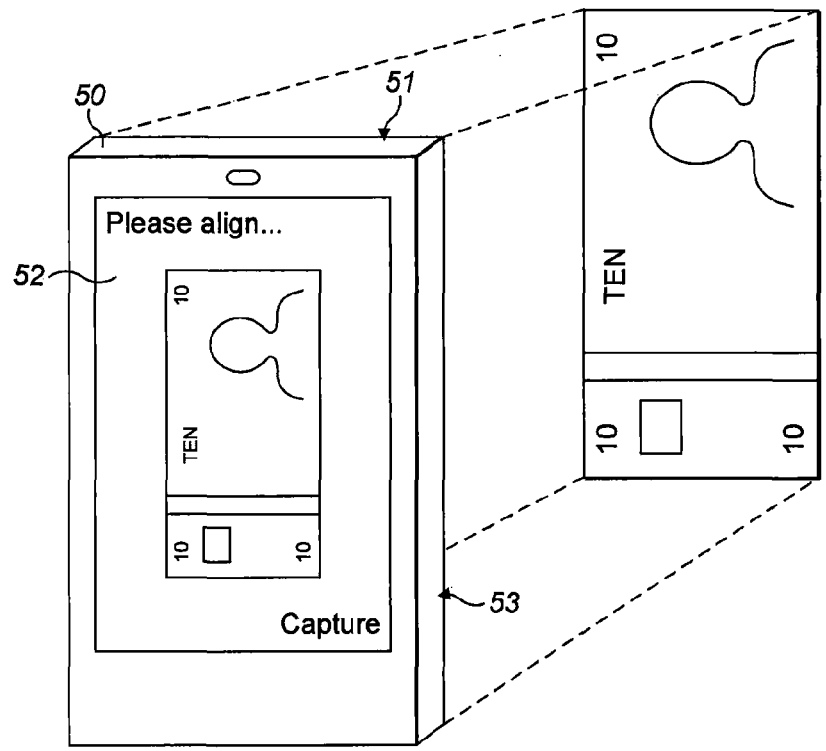
FIG. 5 shows the use of the smartphone camera to image a bank note.
Figure 6:
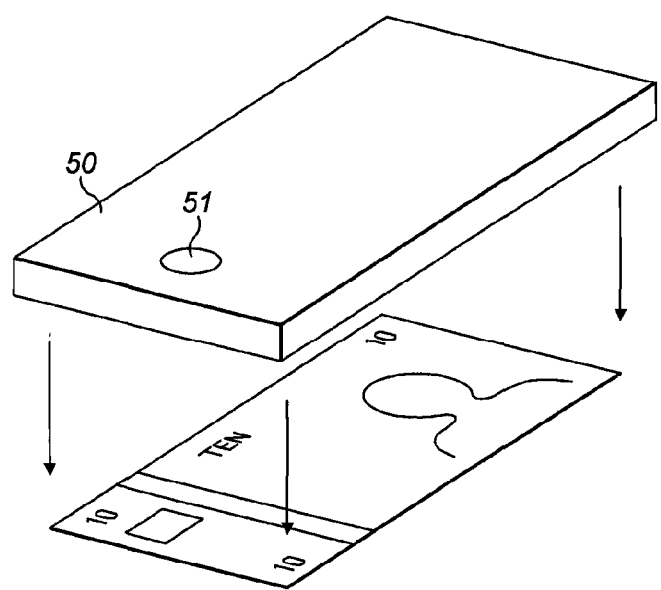
FIG. 6 shows the use of the smartphone touchscreen to make capacitive measurements.

The use of a smartphone in the present example is now described in association with the flow diagram of FIG. 4, together with the explanatory diagrams shown in FIGS. 5,6.

Starting with a smartphone 50 equipped with a touchscreen 51 and forward facing camera 52 (of which numerous models are available to the public from a number of different providers), at step 200 of FIG. 4 the user of the smartphone firstly accesses an online store of mobile device applications (known in the art as "apps") and downloads an application 53 which embodies the software needed to enable the smartphone 50 to perform the method. Alternatively the functionality could be enabled by taking advantage of the response of native applications to multitouch gestures, such native applications being pre-installed as part of the smartphone operating system.

At step 210, the application 53 is run by the user and this provides on-screen instructions to the user to enable the user to authenticate a bank note 1'. The use of "primed" reference numerals in this example indicates analogous features to the first example described in association with FIG. 2.

At step 220, the application 53 turns on the forward facing camera 52 of the smartphone 50 and displays the camera's live image information on the touchscreen 51. Overlaid on the touchscreen 51 a message is displayed to the user such as "Please align the document face with the camera so that it is as large as possible and all edges can be seen. Then press CAPTURE".

As is shown in FIG. 5, the user places the bank note 1' at a sufficient distance from the smartphone 50 such that the bank note 1' is entirely within the field of view of the camera 52.

At step 230, once the user has correctly positioned the bank note 1' an image of the bank note is captured by the user placing a finger over a region of the touchscreen labelled as "CAPTURE". The image data from the camera is then obtained and stored in the onboard memory of the smartphone 50.

At step 240, which follows immediately after step 230, the application 53 begins processing the image. Image processing includes a number of well known techniques. It is fortunate that modern smartphones are equipped with high quality cameras, large onboard memories and powerful processors. In combination these allow advanced levels of image processing to be performed. Some examples of the image processing performed upon the image data are image cleaning, contrast correction and, for the present case in particular, identification of the corners and edges of the bank note 1' in the image. This allows identification of the two primary dimensions of the bank note 1', after which the image may be scaled accordingly to correct for a presentation angle in which the plane of the bank note 1' is not normal to the optical axis of the camera. Once such initial processing has been completed the image is then processed in order to identify the currency and denomination of the bank note. This may involve a general image comparison between the captured image data and each of a database of currency image master patterns (front and rear faces of each bank note). Alternatively, or in addition, the image processing may include feature recognition within the image so as to identify expected features such as alphanumeric codes, denomination indicia, holograms, security stripes, threads and particular pictorial indicia, these features then being compared with a database of such features (including their relative position) for the relevant possible currencies.

At step 250 the result of the processing is output data labelling the bank note as being of a particular type. This indication may be displayed upon the smartphone touchscreen or may be announced verbally through a speaker of the smartphone.

At step 260 the application then provides further on screen instructions to the user. The user is instructed to locate a particular feature of the bank note 1' such as a holographic foil, conductive ink or a security stripe and then to press the touchscreen firmly onto this feature. This may be achieved by pressing the note with one hand against the touchscreen with the smartphone held in the other hand. Preferably however, one of the smartphone or bank note is rested upon a surface and the other of the two is pressed against it. This is illustrated in FIG. 6. The smart phone may be instructed to proceed by pressing a region labelled "MEASURE" and placing the touchscreen and bank note element in contact within a period of, say, 5 seconds. Alternatively the image received from the camera (or possibly on board orientation sensors) can be used to judge when the note is in position—for example a low level of light from the camera may be indicative of the touchscreen being covered by the bank note 1.

At step 270, once the touchscreen and bank note 1' are in contact, the application 53 monitors the output of the touchscreen controller to attempt to determine the position of any areas of increased capacitance caused by the capacitive feature of the bank note 1'. The application is provided with data concerning the location and size of the capacitive regions by the touchscreen controller. In most cases the touchscreen is able to detect the extent of the capacitive regions in terms of their location and geometry, including each of these for multiple regions. The capacitive touchscreen data is stored in the onboard memory of the smartphone. A message may be displayed upon the touchscreen to confirm that the data has been successfully read.

At step 280, immediately following step 270, the application 53 uses the output data from step 250 (that identifying the type of bank note imaged) to query the database for the relative location, size and magnitude of capacitive structures upon the bank note 1'. In this example the user is not given any specific instructions regarding the orientation of the bank note 1' when touching the touchscreen. If only one capacitive feature is present on the bank note 1' then the processing involves comparing the combination of size and orientation of the captured capacitance data with known master data already held in the smartphone memory and associated with the identified bank note 1'. This therefore involves performing a mathematical rotation of the data to attempt to correlate the data. This process is simplified if the capacitive feature has a distinctive shape (as might be the case for an irregularly shaped holographic foil, or more simply an elongate stripe). If two features are present then their spacing and relative orientation may also be compared with the master data (which represents the known size and orientation of such features).

In order to simplify the processing and to improve the signal to noise ratio of the data, at step 260, the user may be instructed to position the known feature against a particular part of the touchscreen. For example with a security stripe, the user may be asked to align the stripe generally with the lateral dimension of the bottom of the touchscreen. Furthermore, in the case of large features such as stripes, the user may be asked to provide electrical grounding.

At step 290, once the processing step 280 has been completed, the application 53 may provide an authenticity message to the user if the processing in step 280 has provided a match between the expected and measure capacitive feature geometry above a predetermined level of confidence. Such a message may be "LIKELY AUTHENTIC: 10 POUND STERLING NOTE". This message may also be provided verbally through the smartphone's speaker.

In some cases the shape and/or position of the capacitive structure upon the banknote may be similar to each denomination of a particular currency, in which case the information from the capacitive sensing provides some level of authentication at a currency level only. However, the capacitive elements may be positioned differently in different denominations. Hence, whilst it is often possible for image processing to provide both currency type and denomination information, the shape and position of the capacitive structure(s) may provide for additional authentication at each of the currency and denomination level. Indeed further benefit may be derived for smartphone users with visual impairments if the capacitive sensing is also used to provide denomination information to the user (for example audibly). For example if a rapid determination were needed the application software could be programmed to perform only a basic image test on the currency, which may not provide sufficient denomination information, and the denomination information could then be confirmed by the use of capacitive sensing where the sensed elements have a geometry or position which is denomination dependent.

As will be appreciated from the above discussion, the usual provision of a camera 51 in a smartphone provides a very convenient implementation of a "second sensor" according to the invention. A further advantage provided by most smartphones is that they are connectable (either in a wired manner through a port, or wirelessly) to other devices. Hence it is possible to provide a peripheral device which is connectable to a smartphone and which may contain a replacement second sensor (such as a magnetic sensor) or may contain a further second sensor for use in addition with the second sensor (such as camera 51) already present. The method of FIG. 4 may therefore be modified to include replacement or further steps relating to obtaining information from the banknote using such a peripheral device. The use of such peripheral devices would also be applicable where using a laptop or similar device in place of a smartphone. For example, if the trackpad or touchpad of a laptop is used as the capacitance sensor, the second sensor(s) can take the form of a camera provided as part of the laptop, and/or could be provided by a peripheral device which is connectable to the laptop in the same manner as described above in relation to smartphones.

Figure 7:
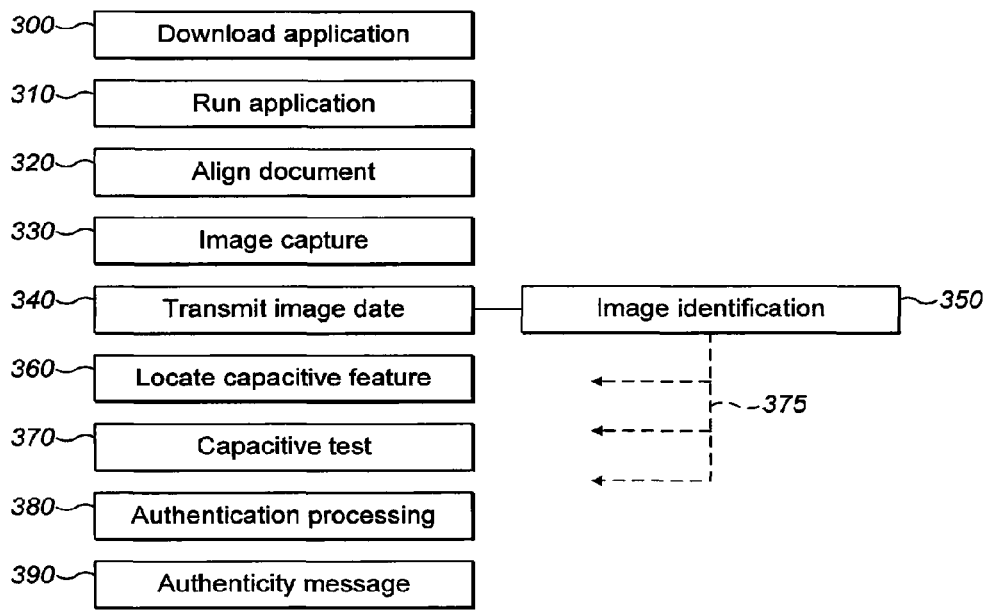
FIG. 7 is a flow diagram of a further smartphone example using remote image processing on a server.
Figure 8:
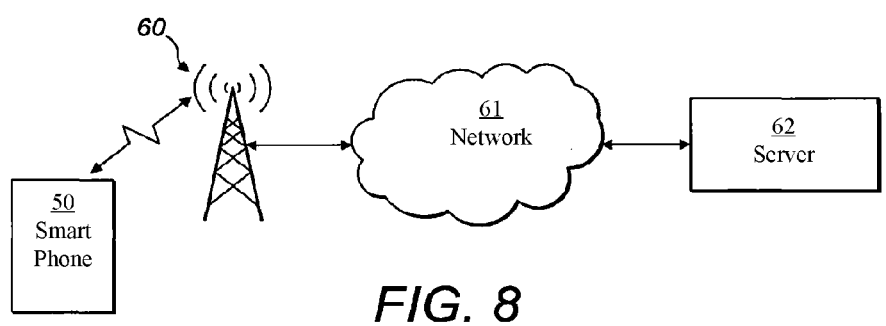
FIG. 8 is a schematic representation of the system embodying the server example.

In an alternative example of the use of a smartphone, a remote server may be implemented to provide the main processing of the data read from the camera 51 and, optionally, the touchscreen 52 also. This is illustrated in FIGS. 7 and 8. The method steps 300 to 330 in FIG. 7 are analogous to steps 200 to 230 of FIG. 4. At step 340 however, rather then processing the data, the image data which has been captured by the camera is transmitted to a nearby mobile base station 60 of a cellular mobile telecommunications network 61 to a remote server 62. Preferably a high data-rate network protocol is used (such as according to "3G" or LTE standards, or equivalents). Step 340 is a "background" process which may proceed whilst other steps are performed using the smartphone 50. In addition once the transmission of the data has been completed the step of image identification 350 (somewhat analogous to 250 in FIG. 4) may be performed in parallel by the remote server 62. The steps of locating (360) and testing (370) the capacitive feature(s) may be following in a similar manner to FIG. 4.

In this example the remote server 62 identifies the type of bank note by performing image analysis on the image data. The advantage of performing this step on the remote server is that such a server may be provided with much greater image processing capabilities, may be readily kept up to date with differences in currency types and denominations and may store effectively a worldwide catalogue of such currencies meaning that the method could be performed for any currency in any country.

In the particular example the identity of the banknote is returned via the mobile telecommunications network from the remote server to the smartphone 50 at any time after step 340 and before step 380. If this information has not been received by step 380 then a message "REMOTE PROCESSING—PLEASE WAIT" is displayed on the touchscreen 52. The content of the identity information returned from the server not only includes the identity of the banknote but also data regarding the nature and position of the capacitive security features on the note, this information being used in the later processing step 380.

At step 380, in a similar manner to step 280, this information regarding the capacitive structures is compared with the information obtained from the banknote in the test step 370. As for FIG. 4, at step 390 an authenticity message is displayed.

In addition to handheld and portable devices the invention may also be implemented in static equipment such as high speed currency processing system. An example of such as system is now described with reference to FIG. 9.

Figure 9:
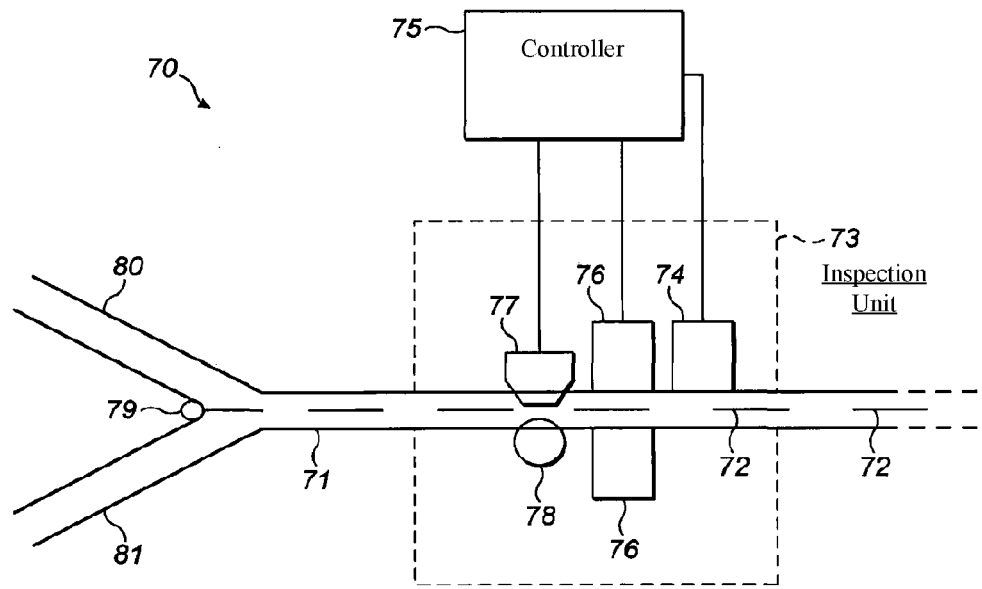
FIG. 9 shows a schematic section through an example implemented within banknote processing apparatus; and, FIG. 10 shows a security document in the form of a label bearing a barcode.

FIG. 9 shows a high speed banknote authentication system 70. This system is capable of processing in excess of 600 banknote per minute and therefore requires high speed analysis of banknote features. In the present case the banknotes 71 are fed in a "short edge" feed orientation, along a transport path 72. During use, the banknotes 71 are fed along the transport path 71 through an inspection unit 73 which contains a number of sensors used in the authentication of the banknotes 72. The inspection unit 73 includes an optical reflection imaging detector 74 which obtains colour images of the upwardly directed face of the banknotes and passes the image data obtained to a system controller 75 which contains a processor having access to a database of master patterns. Downstream of the imaging detector 74 a transmissive detector 76 is positioned to monitor for the existence and position of watermarks within the banknotes. This is achieved by imaging transmitted light through the banknote. The data obtained from the transmissive detector 76 is also sent to the system controller 75. Further downstream of the transmissive detector 76 is positioned a capacitance detector 77. A nip roller 78 is located in the transport path beneath the capacitance detector 77. The nip roller 78 ensures a sound physical contact is achieved between the capacitance detector 77 and the banknote 72. Any electrically conductive features in the banknote 72 act as one of two capacitor "plates", the other plate being in the capacitive detector 77 which is covered by a thin layer of dielectric material. The electrically conductive features may alternatively represent a modification of the geometry of an existing second plate of the capacitive detector 77.

The capacitive detector 77 in this case is arranged as an array of similar sensors which effectively divide the bank note 71 into a number of corresponding regions. Signals from the various sensors in the array allow the system controller 75 to generate a capacitance "image" of the banknote 72 under inspection. The capacitance data from the capacitance detector is used, together with the data from the transmissive detector 76 and imaging detector 74 to provide, as output data, a measure of authenticity confidence in the banknote's authenticity. If the authenticity confidence is above a certain threshold then a diverter 79 downstream of the inspection unit 73 is operated by the system controller 75 to direct the banknote 72 along an "authentic" path 80, whereas banknotes for which there is insufficient confidence in their authenticity are directed down a rejection path 81.

The provision of a capacitance detector 77 is extremely beneficial in providing a further interrogation technique for high speed banknote processing systems such as the system 70. Whilst the above described system combined reflective, transmissive and capacitance sensing it will be appreciated that other or additional sensing devices may be implemented in place of or in addition to the detectors 74, 76.

Each of the examples described above many be used to detect the capacitive signature of bank notes already in circulation. However, they may provide further advantage in being used in conjunction with features or security elements which are fabricated for the specific purpose of identification using capacitive means.

In the abovementioned examples there have been no specified requirements for any relationship between the features detected by the respective capacitance and second sensors. In some applications it is advantageous to perform sensing or detection from the same feature or part of a feature. An example of this is now described in the context of object tracking so as to illustrate the wide applicability of the invention across various applications.

In this context the idea is to present information of a first type from a particular region of an element (or all of it) to one sensor and to present information of a second type to the other sensor. An example is one of the standard forms of single dimension bar code.

Figure 10:
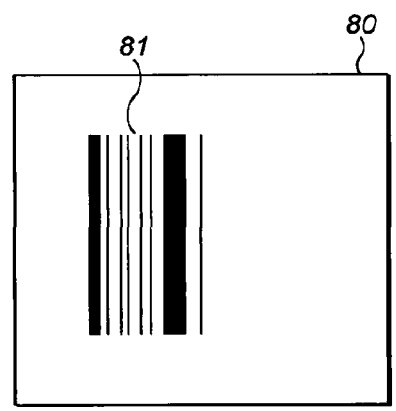

FIG. 10 shows a barcode 81 (schematic) printed on the surface of an adhesive label 80. The barcode is indicative of the product to which the label is attached. As is well known the exact nature of the position and size of the bars in the code is determined according to specific standards. In the present case the barcode 81 is printed with a silver ink using a suitable printing process. The apparatus described in any of the earlier examples may be used in association with such a barcode, although in the case of a banknote processing system then appropriate changes to the transport path would of course be needed depending upon the type of item being transported.

In the present case a modification of the smartphone example of FIG. 4 may be used. Hence, whilst executing an appropriate application, the smartphone 50 may be operated to firstly obtain an image of the barcode 81 of the label 80 using the camera 51. This can then be used to interpret the barcode in a known manner so as to identify the object to which the barcode is attached. However, to increase the level of authentication, the touchscreen 52 of the smartphone may be then pressed against the barcode and a capacitive reading may then be taken. In this case a capacitance "image" is taken using the touchscreen as a stationary snapshot image. However, alternatively, and particularly in the case where the touchscreen controller is unable to track more than a small number of capacitive contacts, the touchscreen may be swiped across the barcode and an area of the touchscreen may be repeatedly sampled for capacitive signals. In an onboard processing step, the information from the barcode as an optical image may be compared with the capacitive image from the touchscreen and, if there is sufficient correlation, the identity of the product maybe obtained and authenticated. We note here that the outcome of such a comparison may be indicated to the smartphone user directly as well as being transmitted (such as via the mobile telephone network or via a local wireless network) to a remote tracking server (for which the server 62 in FIG. 8 could be adapted for use). Thus in this case the authenticity of the source of the camera's image (the barcode) is checked by using the capacitance sensing capability of the touchscreen.

This example may be extended further, depending on the capability of the touchscreen hardware, to detect matrix barcodes of which a QR Code® is an example. A traditional one dimensional barcode merely requires a scan by an interrogating sensor. However, in the case of a matrix barcode the information presented is two dimensional, effectively requiring repeated scans in two dimensions or, more practically, an imaging sensor. If the touchscreen of the smartphone is capable of obtaining capacitive images with a sufficient resolution then it may also be used to authenticate a matrix barcode. We note here that it is not essential in all applications for the capacitive sensing capability of the touchscreen to be able to "read" the QR code, since the purpose of the capacitive sensing is authentication it may be used to read a level of information having a level of resolution lower than that required to read the QR code information itself. For example, it may be sufficient for the touchscreen to read certain parts of the QR code, examples of which would be an ability to locate the three corner positioning symbols and, optionally, the additional alignment symbol.

The barcodes of each type discussed above may be implemented using conductive inks or using patterned foil techniques.

It is also contemplated that, for some applications where the security document is provided with a serial number, that number may be provided as a conductive element. For example it may be printed using conductive ink. If the serial number is of sufficient size in comparison with the capacitance sensor used, then the serial number itself may be read and processed. For example the serial number, once read, could be authenticated against known serial numbers for the type of document identified.

A further use of serial numbers in relation to security documents is in producing a number of different documents having a relationship between the serial number and the response of a separate capacitive element. In this case the serial numbers, which would not need to be provided as conductive elements, could be read using a conventional camera as the second sensor. The security documents could be arranged in batches such that documents with serial numbers in a particular range may be provided with a specific type of capacitive element having a certain response. Batches of serial numbers in other ranges could be associated with batch-specific capacitive elements, such elements having responses which are unique to the batch. It would then be possible to read a serial number for a particular document such as a banknote, to also obtain the capacitance information from the capacitive element and then correlate the capacitive response with whether or not the read serial number falls within the expected serial number range for the batch, thereby providing a further authentication check.

Whilst it may be helpful to use elements which have a visible correlation in terms of geometry with the capacitive structure, this is not essential. The overprinting of inks or foils can be used as a technique to make parts of these elements invisible to the naked eye and therefore allow for applications where the capacitive function of at least part of the element may be provided covertly in order to further deter counterfeiting. An example of this might be where an RFID component is present within the document. In this case the location of the RFID antenna may be sensed using a capacitive sensor (either embodied as a touchscreen or otherwise). Such an antenna may be visibly present on the surface of the document or it may be embedded or otherwise covered (for example with printing, a foil or another applied layer).

The invention claimed is:

1. A method of identifying a security document using an identifying device provided with a capacitance sensor and a second sensor, the second sensor being an imaging sensor, the method comprising:
   a) capacitively coupling a first element of the security document with the capacitance sensor;
   b) obtaining first data from the first element using the capacitance sensor;
   c) obtaining second data in the form of image data from the security document using the second sensor;
   d) analyzing whether the first data and second data are related by a predetermined relationship; and
   e) generating output data based upon the analyzing of the first and second data.

2. A method according to claim 1, wherein step (a) comprises contacting the capacitance sensor with the surface of the security document.

3. A method according to claim 1, wherein the first data is obtained as a result of providing relative movement between the first element and the capacitance sensor.

4. A method according to claim 1, wherein the first data comprises spatial information relating to the first element.

5. A method according to claim 1, wherein the first data comprises information relating to the size, shape or position of the first element within the security document.

6. A method according to claim 1, wherein the second data obtained in step (c) relates to a physical characteristic of the security document.

7. A method according to claim 1, wherein the second data is obtained from the security document in respect of a second region, the second region comprising at least a part of a first region comprising the first element.

8. A method according to claim 1, wherein the first data and second data represent substantially the same information.

9. A method according to claim 1, wherein the first data represents either part of the second data or represents the second data at a lower resolution.

10. A method according to claim 1, wherein step (d) comprises the identifying device transmitting one or each of the first and second data to a remote computer, wherein the remote computer applies the transmitted data to the predetermined relationship thereby generating result data and wherein the remote computer transmits the result data to the identifying device.

11. A method according to claim 1, further comprising generating an output signal in accordance with the output data.

12. A method according to claim 11, wherein the output signal is a signal to a user of the identifying device regarding one or each of the identity or authenticity of the security document.

13. A method according to claim 11, wherein when the identifying device is provided in automatic security document processing apparatus, the apparatus is configured to automatically direct the document to a location in dependence upon the output signal.

14. A method according to claim 1, wherein the first element contains an electrically conductive region.

15. A method according to claim 14, wherein the electrically conductive region is region of metallic foil or conductive ink.

16. A method according to claim 1, wherein at least part of the first element is a one dimensional or matrix barcode.

17. A security document identifying device adapted to perform the method according to claim 1, wherein the device comprises a capacitance sensor, a second sensor, the second sensor being an imaging sensor, and an onboard computer, and wherein the step of generating the output data comprises the identifying device providing one or each of the first and second data to the onboard computer, wherein the onboard computer processes the data according to a predetermined relationship thereby generating result data and wherein the onboard computer provides the result data to a recipient.

18. A security document identifying device according to claim 17, wherein the device is a handheld device.

19. A security document identifying device according to claim 17, wherein the capacitance sensor is a capacitive touchscreen, touchpad or trackpad.

20. A security document identifying device according to any of claim 17, wherein the identifying device is a mobile telephone device.

21. A security document identifying system adapted to perform the method according to claim 17, wherein the system comprises:
   an identifying device provided with a capacitance sensor and a second sensor, the second sensor being an imaging sensor; and,
   a computer in selective communication with the identifying device,
   wherein the step of generating the output data comprises the identifying device transmitting one or each of the first and second data to the computer, wherein the computer processes the transmitted data according to a predetermined relationship thereby generating result data.

22. A security document identifying system according to claim 21, wherein said system is a banknote authenticating system.

23. A computer program product comprising computer program code adapted to perform the method according to claim 1, when the computer program code is executed upon a computer device, the computer device being configured in use for functioning as an identifying device.

* * * * *